United States Patent [19]

Wolf, Jr.

[11] Patent Number: 4,938,831
[45] Date of Patent: Jul. 3, 1990

[54] BONDING METHOD FOR PREPARING AUTOMOTIVE HEADLAMP ASSEMBLIES

[75] Inventor: Robert E. Wolf, Jr., Framingham, Mass.

[73] Assignee: The Kendall Company, Boston, Mass.

[21] Appl. No.: 147,832

[22] Filed: Jan. 25, 1988

[51] Int. Cl.⁵ .................. B32B 31/12; B32B 31/28; C08F 299/04; C08F 299/06
[52] U.S. Cl. .................. 156/275.3; 156/107; 522/14; 522/93; 522/96
[58] Field of Search .......... 522/93, 14, 93, 96; 156/272.2, 275.3

[56] References Cited

U.S. PATENT DOCUMENTS

| | | | |
|---|---|---|---|
| 4,188,455 | 2/1980 | Howard | 522/93 |
| 4,219,377 | 8/1980 | Albrecht | 522/129 |
| 4,239,866 | 12/1980 | Reitel | 522/93 |
| 4,286,008 | 8/1981 | Reed | 522/93 |
| 4,598,130 | 7/1986 | Robeson | 525/439 |
| 4,746,710 | 5/1988 | Dickinson | 525/439 |

OTHER PUBLICATIONS

Registry file printout for Lexan 4701, undated.

Primary Examiner—John C. Bleutge
Assistant Examiner—Arthur H. Koeckert
Attorney, Agent, or Firm—Alvin Isaacs

[57] ABSTRACT

Novel systems for bonding a polyarylate substrate to another polyarylate substrate or to a polycarbonate substrate, at least one of the substrates being transparent, employing a visible light curable adhesive composition consisting essentially of:

(1) at least one member of the group consisting of monofunctional acrylic monomers, polyfunctional acrylic monomers, and polyfunctional polyester acrylate oligomers;
(2) N-vinyl pyrrolidone;
(3) at least one low molecular weight aliphatic urethane acrylate polymer; and
(4) a catalyst or photoinitiator activatable by visible light.

The invention is particularly directed to the bonding of component parts of automotive headlamp assemblies, at least one component of which comprises a polyarylate.

12 Claims, 1 Drawing Sheet

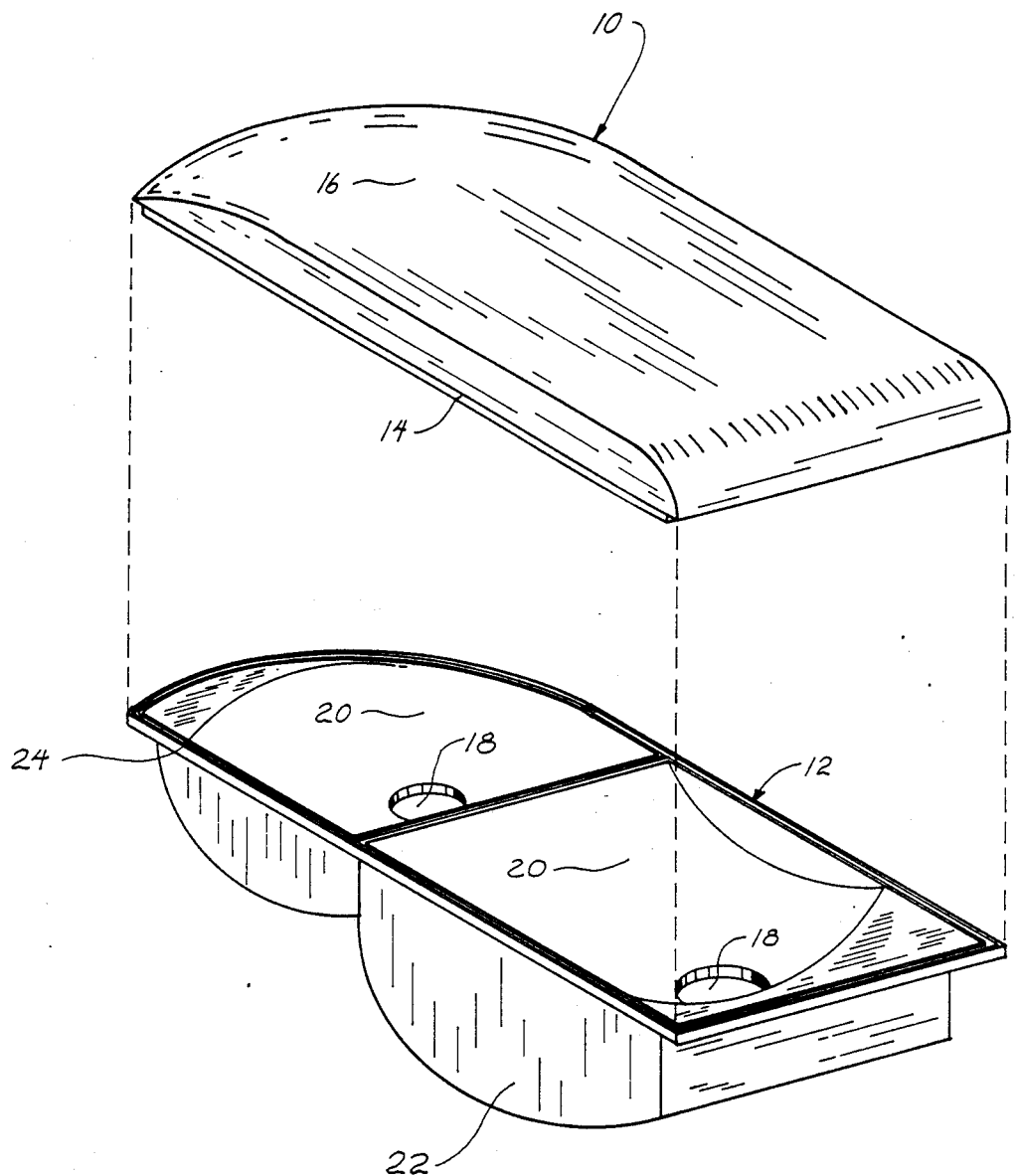

BONDING METHOD FOR PREPARING AUTOMOTIVE HEADLAMP ASSEMBLIES

RELATED APPLICATION

Ser. No. 947,680, now abandoned, Filed Dec. 30, 1986 in name of Zoltan G. Csuros assigned to the common assignee.

BACKGROUND OF INVENTION

The present invention relates to primarily the preparation of automotive headlamp assemblies by bonding a polyarylate component (as described with more particularity hereinafter) to another such component or to a polycarbonate substrate.

Automotive headlamp assemblies in general consist of two parts: a headlamp housing in which the lamps are seated; and a transparent front cover. The seal bonding the transparent cover to the housing must meet rigid requirements which in general may be described as stability against weather and normal environmental use and conditions (other than collision) over the life of the vehicle.

In the evolution of material selection for such headlamp assemblies, it has now become common to manufacture the two components from polycarbonates. While the front cover will of course be transparent, the housing will be opaque with the interior having a reflective coating for increased illumination.

Prior to the present invention, such headlamp assemblies have in general been bonded or sealed by one of two methods: (1) a two-part thermally curable urethane adhesive; or (2) vibration welding. In the former, the two-part urethane composition is mixed and applied, the parts are assembled and the resulting assembly is then passed through an oven for a time and at a temperature to effect curing. In the vibration welding system, the assembled parts are subjected to vibration, e.g. sonic vibration, to melt and weld the surfaces together.

Both systems require capital expenditure for the necessary equipment. In addition, the vibration welding technique is limited by the geometric shape of the articles to be assembled. More importantly, neither system is sufficiently rapid to satisfy completely the manufacturing needs of an automotive assembly plant.

For these reasons, there is a great need in the automotive industry for a system for manufacturing headlamp assemblies more rapidly and with less capital expense and equipment.

In accordance with the present invention, the aforementioned objects are achieved in an elegant and highly efficacious manner by employing the photocurable compositions which will be described in detail hereinafter.

Photopolymerization, or radiation curing, as it is sometimes called, is in general well known. It has been referred to in the literature as "the quiet revolution". From a modest beginning in the early 1970's when it was employed primarily in printing, papermaking, and filling and coating flat wood stock, this "quiet revolution" in the technology has transformed it into a crowded art replete with patent literature. In recent years, this revolution has expanded the technology into the electronics industry, e.g. for photoresists and connectors, and for encapsulating components and sealing circuit boards, as well as into the fields of paints, fiber optics, jewelry, and dental and medical applications. Today, radiation-cured inks, coatings and adhesives are found in such diverse items as furniture, beverage cans, plastic containers, microchips and a host of other products.

Of the four major types of radiation curing known in the art, namely, ultraviolet (UV), electron beam (EB), infrared (IR) and visible light (VL) curing UV and EB have dominated the market, UV being most predominant. For example, in the early 1980's, UV curing was found in about 85% of the radiation-cured applications. EB, a relatively high capital-cost system, was the curing agent in nearly all the remaining applications, particularly for thicker, heavily pigmented coatings. IR curing, which was developed first, has been almost entirely supplanted by UV. Most recently, visible light curing has found application, mainly in such areas as dental restoration and tooth fillings.

In general, the purpose behind the development of radiation curing has been to eliminate the need for solvents and for ovens and the like for removing these solvents. Thus, radiation-cured inks, coatings and adhesives have afforded such advantages over their solvent-containing counterparts as being more economical, faster and safer. These advantages account primarily for the "quiet revolution" in the technology.

Typically, radiation-curable compositions, e.g. adhesive compositions, will include at least one suitable polymer or oligomer, a photoinitiator and a liquid monomer in which the various other ingredients are soluble, the monomer being cross-linkable with the polymer in the presence of the curing actinic radiation which, as mentioned, is UV light for most applications. In general, irrespective of the source of curing radiation employed, these liquid compositions may be characterized as being solvent-free and possessing an excellent shelf life, in that they may be stored in the absence of curing radiation for long periods of time.

The liquid monomers which have heretofore been suggested for use in radiation curable compositions include both mono and polyfunctional monomeric materials, the latter having more reactive sites to increase the crosslink density. Mixture of mono- and poly-functional monomers provides a useful way of varying the degree of hardness of the cured composition.

As examples of monomers heretofore employed, mention may be made of butanediol dimethacrylate, butoxyethyl methacrylate, butyl methacrylate, diethylaminoethyl methacrylate, diethylene glycol dimethacrylate, dimethyl-aminoethyl methacrylate, ethylene glycol dimethacrylate, 2-ethylhexyl methacrylate, ethoxyethyl methacrylate, glycidyl methacrylate, hydroxyethyl methacrylate, hydroxypropyl methacrylate, methyl methacrylate, neopentyl glycol dimethacrylate, polyethylene glycol dimethacrylate, tert.-butyl-aminoethyl methacrylate, triethylene glycol dimethacrylate, tetrahydrofufuryl methacrylate and trimethylolpropane trimethacrylate. Other monomers which may be used include acrylates such as butylene glycol diacrylate, n-butylacrylate, diethylaminoethyl acrylate, 2-ethylhexyl acrylate, ethoxyethyl acrylate, hexanediol diacrylate, polyethylene glycol diacrylate, phenoxyethyl acrylate, pentaerythritol triacrylate, trimethylolpropane triacrylate, triethylene glycol diacrylate, etc.; acrylamides such as N-isobutyloxymethyl acrylamide, N-methylolacrylamide, N,N,-dimethylacrylamide, N,N,-methylene bisacrylamide, etc.; allyl monomers such as allyl glycidyl ether, allyl methacrylate, diallyl phthalate, etc.; as well as various other monomers known in the art, including vinyl monomers, glycidyl ethers and the like.

The list of useful resins and oligomers includes: epoxy acrylate resins, oligoester acrylates, unsaturated polyesters, urethane acrylics, polymethylstyrene, styrene maleic resins, unsaturated polybutadiene hydroxyl terminated, tall oil and rosin derived resins, liquid polyamides, unsaturated alkyds, phenolics, vinyl esters, bisphenol type polyesters, halogenated polyesters, furan resins and the like.

The photoinitiators employed will vary according to the source of curing radiation. In typical UV systems, monomethyl ether of benzoin or a higher alkyl benzoin ether may be used as the activator along with or without a peroxide polymerization catalyst. Absorption of UV radiation causes the ether to decompose into free radicals which then initiate the polymerization reaction. On the other hand, visible light activated products usually employ a non-aromatic amine such as N,N-dimethylaminoethyl methacrylate in combination with a ketone or diketone such as camphorquinone, benzil, etc. The ketone or diketone absorbs radiation in the 400–500 nm range, producing an excited triplet state which, in conjunction with the amine, results in ion radicals.

While not intended to be fully comprehensive, the foregoing survey will serve to illustrate the extensive state of the art pertaining to photopolymerization and the long list of suitable monomers, resins and oligomers available for selection by the polymer chemist wishing to formulate a photopolymerizable composition.

As was mentioned previously, the patent literature is replete with references to various radiation-curable compositions, including combinations of polymers and monomers, which can be employed in such compositions. The following patents are illustrative of the state of the art.

U.S. Pat. No. 4,073,777 issued to O'Neill et al contains a detailed disclosure of unsaturated, water-dispersible polyester adhesives, films and textile finishes.

U.S. Pat. No. 4,082,710 issued to Vraneken et al dislcoses specified isocyanate-modified compounds consisting of the reaction products of an organic isocyanate with compounds with multiple acrylic radicals, which isocyanate-modified compounds can be polymerized in the presence of visible or UV light. They may be used either singly or mixed with other materials, such as inert non-copolymerizable polymers, reactive copolymerizable polymers, copolymerizable oligomers, inert plasticizers, inert organic solvents, copolymerizable olefinically-unsaturated monomer compounds and various adjuvants.

U.S. Pat. No. 4,181,752 issued to Martens et al relates to pressure-sensitive adhesives obtained by subjecting a solventless radiation-sensitive acrylate-containing polymerizable mass to radiation in the near UV region. Disclosure is made of procedures for the free radical copolymerization in the presence of UV of an acrylate, i.e. an acrylic acid ester of an alkanol and a monomer such as acrylic acid, methacrylic acid, acrylamide, acrylonitrile, methacrylonitrile, N-substituted acrylamides, hydroxy acrylates, N-vinyl pyrrolidone, maleic anhydride and itaconic acid.

U.S. Pat. No. 4,206,025 issued to Vraneken relates to specified acrylic polyesters that can be cured by UV or EB. These polyesters are described as meaning polymerizable organic compounds obtained by the polyesterification of dicarboxylic acid with a stoichiometric excess of OH groups of di-and polyhydric alcohols, the excess hydroxyl groups being then esterified with acrylic acid or one of its functional derivatives.

U.S. Pat. No. 4,530,746 issued to Azuma et al relates to photopolymerizable resin compositions comprising a monomer, e.g. a vinyl-end capped monomer, showing slight shrinkage upon polymerization. Specifically, the disclosed compositions comprise: (a) the aforementioned monomer; (b) at least one epoxy-acrylate, 1,2-polybutadiene, polyester or organopolysiloxane resin having one or more acryloyloxy groups or methacryloyloxy groups on their molecular end or ends; and (d) a photosensitizer.

U.S. Pat. No. 4,533,446 issed to Conway et al discloses an anaerobic adhesive composition activatable by UV or visible radiation comprising: (a) an anaerobically polymerizable acrylate ester monomer, (b) a compound which decomposes upon exposure to ultraviolet or visible light to release a strong acid, (c) a peroxy free radical initiator, and (d) an activator of anaerobic polymerization which, in the presence of a strong acid, reacts with the peroxide initiator to catalyze polymerization of the monomer.

As mentioned earlier, visible light curable adhesives have to date found industrial application primarily in the dental arts, e.g. restoration and fillings. In general, such compositions employ one or more methacrylic monomers, one or more oligomers or polymers, and of course the photoinitiator system. As examples of illustrative patents pertaining thereto, mention may be made of U.S. Pat. Nos. 4,407,984; 4,439,380; 4,459,153; 4,525,256; 4,563,153; and 4,581,389.

The aforementioned copending application Ser. No. 947680 is directed to the aforementioned objectives for preparing headlamp assemblies utilizing polycarbonate substrates e.g. "Lexan" 141 (trademark of General Electric). In accordance with the invention described an claimed therein, these objectives are accomplished by employing a visible light curable composition consisting essentially of: one or more polyfunctional acrylic monomers; (2) a polyfunctional aliphatic urethane acrylate polymer; and (3) a catalyst or photoinitiator activatable by visible light.

The adhesive formulations of this prior application were satisfactory with the polycarbonate substrates such as "Lexan" 141 utilized in preparing the headlamp components. Recently, however, styling changes in the automotive industry have demanded headlamps significantly smaller in size, yet possessing comparable illumination capabilities. This design change has necessitated the use of higher output bulbs that operate at considerably greater temperatures. Unfortunately, the poor high temperature properties of polycarbonate have been shown to be unacceptable for the construction of headlamp housings in this application. As a result other materials with better high temperature resistance have been sought.

One of these materials, Lexan 4701, a polyester-polycarbonate copolymer manufactured by GE (also referred to in the art as a "polyarylate") has received increasing attention by the automotive industry as a high temperature substitute for polycarbonate. This change in substrate in turn resulted in failure of the adhesive formulations as described and claimed in the aforementioned pending application.

Accordingly the task of the present invention may be described as being to modify the forementioned adhesive formulations so that they may be employed with the new polyarylate substrates in preparing automotive headlamp assemblies.

BRIEF DESCRIPTION OF THE INVENTION

In accordance with the present invention, the aforementioned task is solved by providing a visible light curable adhesive composition consisting essentially of: (1) from about 5 to about 40 parts by weight of acrylic compound selected from the group consisting of monofunctional acrylic monomers, polyfunctional acrylic monomers and polyfunctional polyester acrylate oligomers; (2) from about 10 to about 35 parts by weight N-vinyl pyrrolidone (NVP), (3) from about 50 to about 60 parts by weight of low molecular weight aliphatic urethane acrylate polymer; and (4) a catalyst or photoinitiator activatable by visible light.

BRIEF DESCRIPTION OF DRAWING

The Figure is an exploded perspective view of an illustrative automotive headlamp assembly to which this invention is particularly directed.

DETAILED DESCRIPTION OF THE INVENTION

As was mentioned previously, the present invention relates broadly to the art of bonding a transparent substrate to another substrate, at least one of the substrates being polyarylate, the other being polyarylate or polycarbonate. More particularly, it relates to an improved adhesive system for providing polyarylate automotive headlamp assemblies.

In manufacture, such headlamp assemblies consist of two essential components, namely a housing for the headlamp and a transparent front cover or plate through which light from the headlamp within the housing is transmitted. These two components must then be sealed together in a manner sufficient to meet the rigid requirements imposed by automotive manufacturers, which requirements are in turn predicated upon the environmental conditions associated with the operation of the vehicle containing these headlamps.

At present, there are essentially two different systems in commercial production for achieving the requisite standards for stability in usage of the assembly.

The first system utilizes a two-part thermally curable urethane adhesive. In manufacture, the two part adhesive is admixed and applied to one or both surfaces to be bonded and the respective surfaces are then brought into contact to complete the assembly. The headlamp assembly is then conveyed into an oven operating at a temperature and for a time sufficient to provide the adhesive bond. While this adhesive system is completely satisfactory in terms of the quality of the product produced, it nevertheless suffers from certain manufacturing deficiencies, chief of which is the time required for heating to complete the seal. Other disadvantages include the energy consumption and factory space required for the oven. All of the above may of course be translated into cost factor in automotive assembly plants.

The second system for producing headlamp assemblies utilizes the technology known as vibration welding wherein the parts are assembled and subjected to vibration, e.g. sonic vibration, to melt and weld the surfaces together. This system also requires time and energy. Moreover, vibration welding will inherently cause stress and weakening of the bonded area.

Consequently, there has been a long felt need in the automotive industry to find an adhesive which will provide in seconds the requisite seal and, ideally, do so without the need for ovens or the like energy and space consuming equipment. For such an adhesive to be useful, as previously stated, it must pass the following rigid screening tests:

(1) shear adhesion strength at 23° C. —a bond strength of 1393 pounds per square inch (psi) or have substrate failure;
(2) leak test — after pressurizing assembly to about 9 psi and submerging in water at room temperature, no air bubbles should be observed for at least 30 seconds; and
(3) burst test—when slowly pressurizing assembly with air, a pressure of at least 18 psi must be obtained before the assembly bursts.

In addition to these functional characteristics, any adhesive contemplated for commercial use for the headlamp assembly should also be transparent and otherwise innocuous and aesthetically acceptable.

DETAILED DESCRIPTION OF THE INVENTION

In order to justify transition in production from one of the two functionally acceptable systems heretofore described which are currently in production, a new adhesive system should offer significant manufacturing advantages, e.g. satisfy the primary task of appreciably lowering the production time for mass producing the assemblies.

In accordance with the invention, the foregoing objectives are accomplished with a novel visible light curable adhesive composition.

As previously discussed, photopolymerizable adhesive compositions are well known in the art. However, most of the prior art relates to UV curing which is not suitable for the polycarbonate bonding herein contemplated in view of the fact that the polycarbonates are not sufficiently transparent to UV light, even though they transmit light within the visible spectrum. Conversely, while visible light curable adhesives have achieved some notoriety in recent years, their industrial application has been essentially restricted to dental composites and restoration materials. In such dental applications, methacrylates are employed and methacrylates as a class do not cure sufficiently fast to satisfy fully the objectives of this invention.

Also as previously discussed, the aforementioned co-pending application Ser. No. 947680 relates to the use of specified visible light curable adhesive compositions for the preparation of polycarbonate headlamp assemblies. However, in view of the recent change to substrates comprising a copolymer of polycarbonate and polyester, (referred to in the art and, accordingly, in the description and appended claims of this application as a "polyarylate") the adhesive formulations such as are described and claimed in the co-pending application are no longer suitable.

In accordance with the present invention, novel visible light curable adhesive formulations are provided which are entirely satisfactory for use with the newer generation of headlamp components wherein at least one of the substrates to be adhered together comprises a polyarylate, the other being polyarylate or polycarbonate. Specifically, the novel adhesive compositions of this invention consist essentially of: (1) from about 5 to about 40 parts by weight of acrylic compound selected from the group consisting of acrylic monomers and polyfunctional polyester acrylate oligomers; (2) from about 10 to about 35 parts by weight N-vinyl pyrrolidone (NVP), (3) from about 50 to about 60 parts by weight of low molecular weight aliphatic urethane acrylate polymer, and (4) a catalyst or photoinitiator activatable by visible light.

Preferably, the acrylic compounds employed are polyfunctional acrylic monomers and the polymer is a polyfunctional oligomer.

It will be appreciated that the novel compositions of this invention may additionally contain proper amounts of other materials performing specific desired functions, where found desirable or expedient to do so.

As examples of useful polyfunctional acrylic monomers, mention may be made of 1,6-hexanediol diacrylate, tripropylene glycol diacrylate, trimethlolpropane triacrylate, tetraethylene glycol diacrylate, pentaerithritol triacrylate, butylene glycol diacrylate, triethylene glycol diacrylate, etc. For headlamp assemblies, 1,6-hexanediol diacrylate has been found to be particularly useful.

Suitable monofunctional acrylics include cyclohexyl, ethoxyethoxy ethyl, isobornyl, isodecyl, isooctyl, glycidyl and tetrahydrofurfuryl acrylate.

As examples of useful polyfunctional polyester acrylate oligomers, mention may be made of those of the "Photomer" 5000 series (Trdemark of Henkel Co.) e.g. Photomer 5007, a hexafunctional polyester acrylate, and Photomer 5018, a tetrafunctional one.

The acrylic monomers which may be employed in the practice of this invention further includes the mono- or polyfunctional ones heretofore employed in the photopolymerization art..

As examples of suitable aliphatic urethane acrylate polymers which can be employed as the polymeric component, mention may be made of "Chemlink" (trademark of Sartomer Company for a group of aliphatic urethane acrylate oligomers), e.g. Chemlink 9504, specific gravity 25 C=1.17, viscosity, cps 70° F.=167,000, 100° F.=10,500, 140° F.=3,250, and Chemlink 9505, specific gravity=1,20, viscosity, 100° F.=145,000, 140° F.=35,000; "Uvithane" (trademark of Morton Thiokol) 788 or 893; "Novacure" 8800 or 8800—20R (trademark of Interez); Ebecryl 230 (trademark of Radcure Inc); Photomer 6230, 6788, 6893,(trademark of Henkel), etc.

The visible light curative system may comprise the reagents heretofore known in the art for this purpose and which per se comprise no part of this invention. A particular useful system per se known in the art for catalyzing polymerization in the presence of visible light comprise a mixture of a ketone (including diketones) such as benzil, camphorquinone (d-2, 3-bornanedione), or a thioxanthenone, and an amine, preferably N,N-dimethylaminoethyl methacrylate (DMAEM). Generally, the catalyst combination may be employed in a ratio on the order of 1:10 Ketone:amine, although the ratio may be varied.

The proportions of polymer to monomers in the aforementioned compositions may vary and are not capable of precise quantification, but the range of polymer: monomer may be on the order of 1:1 to about 3:2 by weight.

As will be appreciated, the compositions of this invention must be contained in a lighttight environment prior to use. When packaged or stored in the dark, they possess excellent shelf life.

Curing can be effected in any light source, including ordinary room lighting, which will provide visible radiation, e.g. at the 400–500 nm wave length. Preferably, however, curing is effected with a high intensity blue light source, e.g. with a lamp emitting on the order of 50–60 watts/inch energy between 400 and 470 nm. Visible light sources of this description are commercially available and thus well known in the art.

The visible light curable compositions of this invention possess sufficient viscosity, e.g. between 5000 and 45,000 cps so that they can be applied without "running". They may be applied by any of the known methods, for example, by coating, brushing, or with a syringe or other instrument. When applied and exposed to visible light curing radiation, they are characterized by a rapid initial gel, e.g. a few seconds, and complete cure may be obtained in less than ten seconds following exposure to the curing radiation.

In contrast thereto, methacrylics as a class, e.g. those employed in the dental adhesive art, require a much longer curing time, e.g. on the order of 120 seconds. These longer curing times are not satisfactory for the uses envisioned by the present invention.

The following examples show by way of illustration and not by way of limitation the preparation of the novel visible light curable compositions of this invention.

EXAMPLE 1

529.5g (57.0%) Sartomer C-9505 aliphatic urethane acrylate oligomer were heated in an oven at 80° C. for 6 hours to render it pourable. To the hot, mechanically stirred oligomer were added 232.0g (25.0%) N-vinyl-2-pyrrolidone (NVP) at a rate slow enough to insure complete mixing. The total addition time was about 15 minutes. 248.0g (15.9%) of 1,6-hexanediol diacrylate (HDODA) were then added all at once followed by 15.8g (1.7%) N,N-dimethylaminoethyl methacrylate (DMAEM). Finally, 3.72g (0.4%) powdered benzil was charged and appeared to dissolve instantly. Stirring at high speed was continued for a period of 15 minutes to assure homogeneity, yielding the light-curable composition of the formula:

|  | % by Weight |
| --- | --- |
| C-9505 | 57.0 |
| HDODA | 15.9 |
| NVP | 25.0 |
| DMAEM | 1.7 |
| Benzil | 0.4 |

In a similar manner, the following additional formulations were prepared.

EXAMPLE 2

| C9505 | 57.0 |
| --- | --- |
| Propoxylated neopentylglycol diacrylate | 15.9 |
| NVP | 25.0 |
| DMAEM | 1.7 |
| Benzil | 0.4 |

EXAMPLE 3

| C9505 | 57.0 |
| --- | --- |
| Trimethylolpropane triacrylate | 15.9 |

|  | -continued |  |
|---|---|---|
| NVP |  | 25.0 |
| DMAEM |  | 1.7 |
| Benzil |  | 0.4 |

EXAMPLE 4

| C-9505 | 57.0 |
|---|---|
| Tetrahydrofurfuryl acrylate | 15.9 |
| NVP | 25.0 |
| DMAEM | 1.7 |
| Benzil | 0.4 |

EXAMPLE 5

| C-9505 | 54.2 |
|---|---|
| Tetrahydrofurfuryl acrylate | 15.2 |
| Trimethylolpropane triacrylate | 4.8 |
| NVP | 23.8 |
| DMAEM | 1.6 |
| Benzil | 0.4 |

The novel adhesives of this invention are in general characterized as providing unexpectedly high lapshear and impact test results on substrates comprising a copolymer of polycarbonate and polyester.

They are further characterized as providing good fracture toughness, chemical and moisture resistance, as well as excellent resistance to temperature changes and mechanical abrasion.

While, as heretofore described, they have great utility in bonding the surface of a transparent object to another substrate, at least one of the surfaces being polyarylate, the other being polyarylate or polycarbonate, of particular interest to this invention is their ability to seal the aforementioned headlamp assemblies in a matter of a few seconds and in a manner which meets very rigid test criteria.

The drawing illustrates a typical such headlamp assembly. As shown therein, the headlamp assembly will comprise a transparent front cover 10 and a headlamp housing 12. Front cover 10 has a flange 14 extending around its internal periphery and a face 16 which of course is transparent and preferably has a surface which will refract and maximize transmission of light emitted from the headlamp. Housing 12 is shown to have a pair of central openings 18 in its interior surface 20 in which the headlamps are adapted to be seated and through which the terminal base portion of the lamps extend externally for electrical contact; an exterior surface 22 defining the dimensions of the housing; and a grooved front peripheral portion 24 adapted for accommodating the flange 14 of the front cover. Typically, the inner surface 20 of the housing contains a reflective metal coating for increased efficiency of the headlamp.

To seal the headlamp assembly in accordance with this invention, a quantity of adhesive is first positioned substantially uniformly throughout groove 24. Flange 14 is then seated within the adhesive-containing groove to position the two component parts in juxtaposition and visible light is applied for a time and of an intensity to initiate photopolymerization and subsequent adhesive formation to seal the two parts together. This may be accomplished in less than ten seconds following exposure with a high intensity blue light source, as previously described.

Headlamps of the type shown in the drawing were sealed with the compositions of Examples 1-5, and subjected to testing. The test results, including the manufacturer's specifications, are shown in Table 1.

TABLE 1

| Composition | Shear Adhes. @ 23° C. (1393 psi or substrate failure) | Leak Test (no bubbles 30 seconds) | Burst Test (18 psi) |
|---|---|---|---|
| Example 1 | 1340 psi (SF)* | Pass | 40 psi |
| 2 | 1043 psi (SF) | Pass | 27 psi |
| 3 | 910 psi (SF) | Pass | 37 psi |
| 4 | 1970 psi (SF) | Pass | 52 psi |
| 5 | >2000 psi (SF) | Pass | 50 psi |

* = Substrate Failure

Since certain changes may be made without departing from the scope of the invention herein involved, it is intended that all matter shown in the accompanying drawing and described in the foregoing specification, including the example, shall be interpreted as illustrative and not in a limiting sense.

What is claimed is:

1. A method for binding a polyarylate substrate to another polyarylate substrate or to a polycarbonate substrate comprising the steps of:
   (a) applying to the surface of at least one of said substrates to be bonded a layer of a visible light curable adhesive composition consisting essentially of:
      (1) at least one acrylic monomer or polyfunctional polyester acrylate oligomer;
      (2) N-vinyl pyrrolidone;
      (3) at least one low molecular weight aliphatic urethane acrylate polymer; and
      (4) a photoinitiator system activatable by visible light;
   (b) bringing said substrates to be bonded together into superposition whereby opposed surfaces of said applied layer of composition physically contact said respective substrates to be bonded; and
   (c) subjecting said applied layer of composition to visible light while maintaining said respective substrates in contact with said composition, whereby to cure said composition and to bond said substrates together.

2. A method for bonding a polyarylate substrate to another polyarylate substrate or to a polycarbonate substrate comprising the steps of:
   (a) applying to the surface of at least one of said substrates to be bonded a lyaer of a visible light curable adhesive composition having a viscosity of from about 5000 to about 45000 cps and consisting essentially of:
      (1) from abut 5 to about 40 parts by weight of acrylic compound selected from the group consisting of monofunctional acrylic monomers, polyfunctional acrylic monomers and polyfunctional polyester acrylate oligomers;
      (2) from about 10 to about 35 parts by weight of N-vinyl pyrrolidone;
      (3) from about 50 to about 60 parts by weight of low molecular weight aliphatic urethane acrylate polymer; and
      (4) a photoinitiator system activatable by visible light;
   (b) bringing said substrates to be bonded together into superposition whereby opposed surfaces of said applied layer of composition physically contact said respective substrates to be bonded; and (c) subjecting said applied layer of composition to visible light while maintaining said respective substrates in contact with said composition, whereby to cure said composition and to bond said substrates together.

3. A method for preparing an automotive headlamp assembly from molded component parts comprising a transparent cover and a headlamp housing, said component parts being adapted to be placed in superposition and when bonded to provide said headlamp assembly, at least the surface to be bonded of one of said components being polyarylate, the surface to be bonded of the other of said components being polyarylate or polycarbonate, said method comprising the steps of:

(1) applying to at least one of said surfaces for bonding a layer of a light-curable adhesive composition consisting essentially of:
   (a) at least one acrylic monomer or polyfunctional polyester acrylate oligomer;
   (b) N-vinyl pyrrolidone;
   (c) at least one low molecular weight aliphatic urethane acrylate polymer; and
   (d) a photoinitiator system activatable by visible light.
(2) bringing said respective surfaces of said component parts into superposition whereby said respective surfaces to be bonded are in physical contact with opposed sides of said applied layer of curable adhesive composition;
(3) subjecting said layer of curable adhesive composition to visible light while maintaining said respective surfaces in superposition and in physical contact with said layer of curable adhesive composition, whereby to cure said composition and thereby bonding said component parts together.

4. A method as defined in claim 3 wherein said composition has a viscosity of from about 5000 to about 45000 cps and contains:
   (a) from about 5 to about 40 parts by weight of acrylic compound selected from the group consisting of monofunctional acrylic monomers, polyfunctional acrylic monomers and polyfunctional polyester acrylate oligomers;
   (b) from about 10 to about 35 parts by weight of N-vinyl pyrrolidone;
   (c) from about 50 to about 60 parts by weight of low molecular weight aliphatic urethane acrylate polymer; and
   (d) a photoinitiator system activatable by visible light.

5. A method as defined in claim 4 wherein said acrylic compound comprises a polyfunctional acrylic monomer.

6. A method as defined in claim 5 wherein said monomer is 1,6-hexanediol diacrylate.

7. A method as defined in claim 5 wherein said monomer is propoxylated neopentylglycol diacrylate.

8. A method as defined in claim 5 wherein said monomer is trimethylolpropane triacrylate.

9. A method as defined in claim 4 wherein said acrylic compound comprises a monofunctional acrylic monomer.

10. A method as defined in claim 9 wherein said monomer comprises tetrahydrofurfuryl acrylate.

11. A method as defined in claim 4 wherein said acrylic compound comprises a polyfunctional polyester acrylate oligomer.

12. A method as defined in claim 4 wherein said polymer comprises a polyfunctional aliphatic urethane acrylate oligomer.

* * * * *